United States Patent [19]

Hayashi

[11] 4,298,111
[45] Nov. 3, 1981

[54] VISCOUS FLUID COUPLING DEVICE

[75] Inventor: Masaharu Hayashi, Toyota, Japan

[73] Assignee: Aisin Seiki Kabushiki Kaisha, Kariya, Japan

[21] Appl. No.: 91,921

[22] Filed: Nov. 7, 1979

[30] Foreign Application Priority Data

Nov. 16, 1978 [JP] Japan .............................. 53/141809

[51] Int. Cl.³ ....................... F16D 35/00; F16D 43/25
[52] U.S. Cl. ................................... 192/58 B; 192/82 T
[58] Field of Search ............................ 192/58 B, 82 T

[56] References Cited

U.S. PATENT DOCUMENTS

| | | | |
|---|---|---|---|
| 3,159,254 | 12/1964 | Weir | 192/58 B |
| 3,463,282 | 8/1969 | Fujita et al. | 192/58 B |
| 3,587,801 | 6/1971 | Riner | 192/58 B |
| 3,809,197 | 5/1974 | Clancey | 192/58 B |
| 3,856,122 | 12/1974 | Leichliter | 192/82 T X |
| 3,972,399 | 8/1976 | Bopp | 192/82 T X |
| 4,060,158 | 11/1977 | Kiruchi | 192/58 B X |

Primary Examiner—Rodney H. Bonck
Attorney, Agent, or Firm—Sughrue, Mion, Zinn, Macpeak and Seas

[57] ABSTRACT

A viscous fluid coupling device for use in automotive vehicles includes an input member driven by a vehicle engine and having a rotor thereon, a reservoir chamber for the viscous fluid and an operating chamber for accommodating the rotor which chambers are formed by a partition plate within an output member rotatable relative to the input member, first passage means formed on the partition plate for sending the viscous fluid from the operating chamber to the reservoir chamber, second and third passage means for communicating the viscous fluid from the reservoir chamber to the operating chamber, and thermal responsive means for opening and closing the second and third passage means in response to the change of temperature.

5 Claims, 3 Drawing Figures

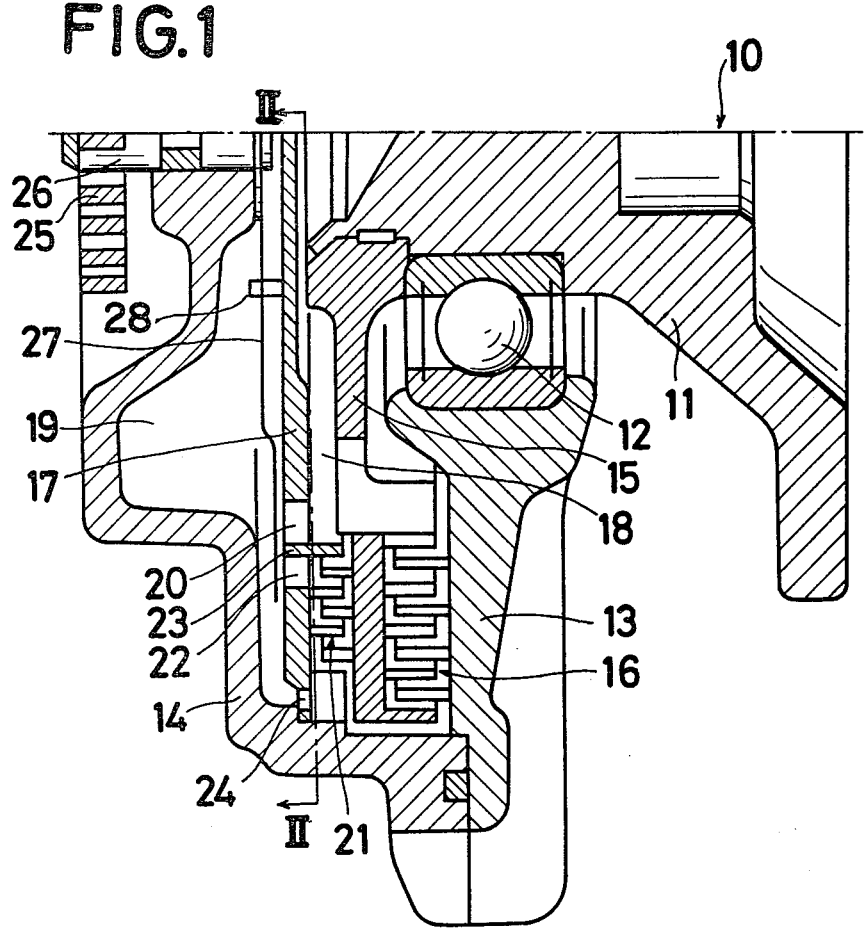

VISCOUS FLUID COUPLING DEVICE

BACKGROUND OF THE INVENTION

1. Field of the Invention

This invention relates to viscous fluid coupling devices which serve as a drive for the radiator cooling fan of a vehicle engine, and more particularly, to such coupling devices which control the transmission of an output torque in steps.

2. Description of the Prior Art

In a conventional viscous fluid coupling device which serves as a drive for the radiator cooling fan of a vehicle engine, it is normally necessary to control the communication of the viscous fluid from a reservoir chamber to an operating chamber in response to the temperature of the engine etc. thereby to prevent the engine from excessive cooling and to decrease a loss of horsepower.

In the conventional viscous fluid coupling device, however, a communicating hole for the viscous fluid between the reservoir chamber and the operating chamber is just opened or closed by a thermal responsive valve member upon detection of the prescribed temperature thereby just to control the transmission of the output torque at two stages.

Accordingly, the conventional device results in insufficient or excessive cooling of engine particularly in the region of the temperature for initiating the actuation of the thermal responsive valve member.

As a result, there are drawbacks in that the noise for the acceleration is increased and the loss of the horsepower is also increased.

SUMMARY OF THE INVENTION

Accordingly, it is an object of the present invention to provide an improved viscous fluid coupling device which may avoid by simple construction the aforementioned drawbacks encountered in the prior art.

It is another object of the present invention to provide a viscous fluid coupling device which can control the transmission of an output torque at three stages.

BRIEF DESCRIPTION OF THE DRAWINGS

Various other objects, features and attendant advantages of the present invention will be more fully appreciated as the same becomes better understood from the following detailed description when considered in connection with the accompanying drawing in which like reference characters designate like or corresponding parts throughout the several views, and wherein.

DETAILED DESCRIPTION OF THE PREFERRED EMBODIMENTS

Figure 1:
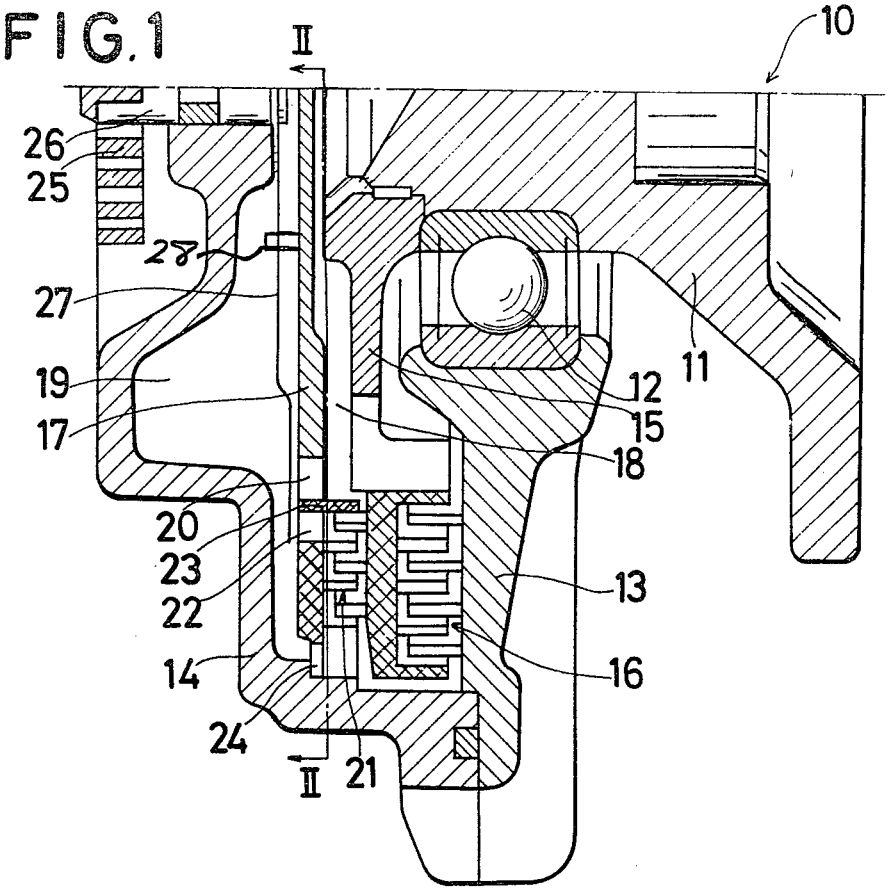
FIG. 1 is a partial sectional view of one embodiment of a viscous fluid coupling device according to the present invention.

Referring now to the drawings, especially FIG. 1 thereof, a viscous fluid coupling device 10 includes an input member or a driven shaft 11 driven by a vehicle engine (not shown), an output member 13 rotatably supported on the driven shaft 11 through a bearing 12, and a casing 14 air-tightly fixed to the output member 13. A cooling fan assembly (not shown) is attached to the casing 14 or the output member 13 by any suitable fixing means.

A rotor 15 having a circular plate shape is fixedly inserted into one end of the driven shaft 11. A labyrinth 16 is constituted by facing portions of the rotor 15 and the output member 13 to transmit the torque from the rotor 15 to the output member 13 upon rotation of the driven shaft 11.

An outer circumference of a partition plate 17 is fixed to a stepped shoulder portion of an inner circumference of the casing 14. The partition plate 17 divides the interior of coupling into an operating chamber 18 and a reservoir chamber 19 for accommodating the rotor 15 within the output member 13 and the casing 14. The viscous fluid, for example, silicon oil reserved in the reservoir chamber 19 is returned to the operating chamber 18 via a first hole 20 which is provided on the partition plate 17 and is transmitted to the torque transmitting labyrinth 16 thereby to transmit the torque from the driven shaft 11 to the output member 13 by a shearing force of the viscous fluid within the operating chamber 18 upon rotation of the driven shaft 11.

The right-hand face of the outer circumference of the partition plate 17 and the left-hand face of the rotor 15 are also provided with the labyrinth 21. The partition plate 17 provides a second hole 22 having smaller effective area than that of the first hole 20. The torque transmission from the driven shaft 11 to the output member 13 is available by the shearing force generated when the viscous fluid returned from the reservoir chamber 19 to the operating chanber 18 via the second hole 22 passes through the torque transmitting labyrinth 21. A partition wall 23 integrally formed with the partition plate 17 prevents the viscous fluid to be supplied to the torque transmitting labyrinth 21 via the second hole 22 from supplying to the torque transmitting labyrinth 16.

The viscous fluid from the operating chamber 18 to the reservoir chamber 19 is supplied by a pumping element 24 provided on the partition plate 17. The amount of the viscous fluid within the operating chamber 18 is determined by the amount transmitted via holes 20, 22 and the amount discharged by the pumping element 24. It is easily understood that the pumping element 24 may be provided on the casing 14.

Figure 2:
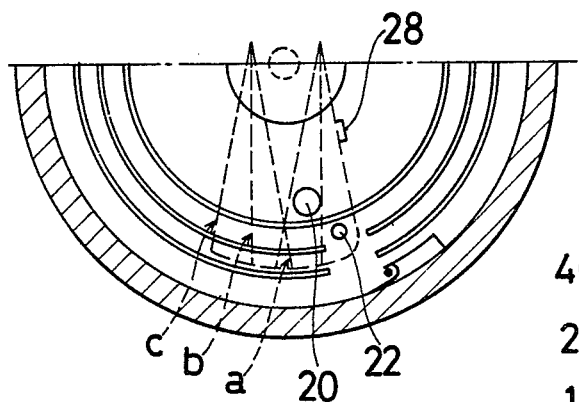
FIG. 2 is a sectional view taken along the line II—II of FIG. 1.

A rod 26 is rotatably actuated by a thermal responsive member, for example, a spiral type bi-metal 25 of which one end is fixed to the casing 14 and the other end thereof is operable with the rod 26. A valve plate 27 is fixed to the rod 26 to rotate therewith. Particularly in FIG. 2, in the case that a first predetermined temperature is detected by the bi-metal 25, the valve member 27 normally located at a position a for closing holes 20, 22, is moved to a position b for only opening the second hole 22. In the case that a second predetermined temperature is detected, the valve member 27 is moved to a position c for opening both of holes 20, 22. A reference numeral 28 is a stopper mounted on the partition plate 17.

Especially during a driving operation of the vehicle at a cold time, in other words, when the temperature detected by the bi-metal 25 is a first predetermined temperature, for example, below 40° C., holes 20, 22 are closed by the valve member 27 and the viscous fluid within the operating chamber 18 is sent into the reservoir chamber 19 by a pumping function of the pumping element 24 thereby to become substantially the smallest amount of the viscous fluid. Accordingly a cooling fan assembly is maintained at a low rotational number as shown by a line d in FIG. 3.

Figure 3:
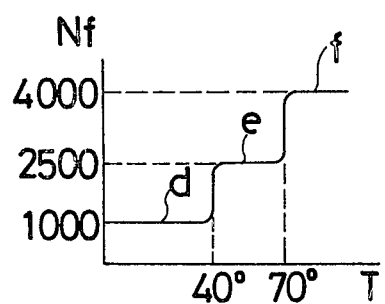
FIG. 3 is a graph showing the characteristics of the viscous fluid coupling device of the present invention.

In the case that a first predetermined temperature is detected by the bi-metal 25, the valve member 27 is located at a position b for only opening the second slot 22 and the rotation of a cooling fan assembly responsive to the amount of the viscous fluid to the torque transmitting labyrinth 21 through 22 is realized (FIG. 3, line e). At this time the communication of the viscous fluid to the torque transmitting labyrinth 16 is prevented by the partition wall 23.

In the case that a second predetermined temperature is detected by the bi-metal 25, the valve member 27 is located at a position c for opening holes 20, 22 and the viscous fluid is applied to the torque transmitting labyrinths 16, 21 thereby to control the rotation of a cooling fan assembly at a high rotation as shown by a line f in FIG. 3.

It is easily understood that a desired performance characteristic of the viscous fluid coupling device can be obtained by suitably changing the effective diameter of holes, the design of the torque transmitting laybrinths, and the operating temperature of the bi-metal etc.

Obviously, numerous modifications and variations of the present invention are possible in light of the above teachings. It is therefore to be understood that within the scope of the appended claims, the invention may be practiced otherwise than as specifically described herein.

What is claimed is:

1. A viscous fluid coupling device, comprising:

an input member driven by a vehicle engine and having a rotor thereon, an output member rotatably supported on said input member, a partition plate member dividing the interior of said device into an operating chamber for accommodating said rotor and a reservoir chamber for the viscous fluid, labyrinth means between said input member and said output member, aperture means in said rotor radially inwardly of said labyrinth means to provide fluid communication between opposite sides of said rotor, first passage means for sending the viscous fluid from said operating chamber to said reservoir chamber, second and third passage means formed on said partition plate member for communicating said viscous fluid from said reservoir chamber to said operating chamber, a partition wall integrally formed with said partition plate member at the radially inner end of said labyrinth means for directing the flow of fluid passing through said first and second passage means to said labyrinth means, and thermal responsive means for opening and closing said second and third passage means responsive to the change of temperature.

2. A viscous fluid coupling device as set forth in claim 1 further comprising:

valve means operatively connected to said thermally responsive means and responsive to said change of temperature of said thermal responsive means for movement relative to said partition plate member for opening and closing said second and third passage means.

3. A viscous fluid coupling device as set forth in claim 1, wherein said first passage means is a pumping element which is provided on said partition plate member.

4. A viscous fluid coupling device as set forth in claim 1, wherein said second and third passage means are holes.

5. A viscous fluid coupling device as set forth in claim 1, wherein said thermal responsive means is a spiral type bi-metal.

* * * * *